J. GAMBS.
ELECTRIC GENERATOR FOR MOTOR VEHICLES.
APPLICATION FILED JULY 27, 1918.
1,391,679.
Patented Sept. 27, 1921.
2 SHEETS—SHEET 1.
FIG.1
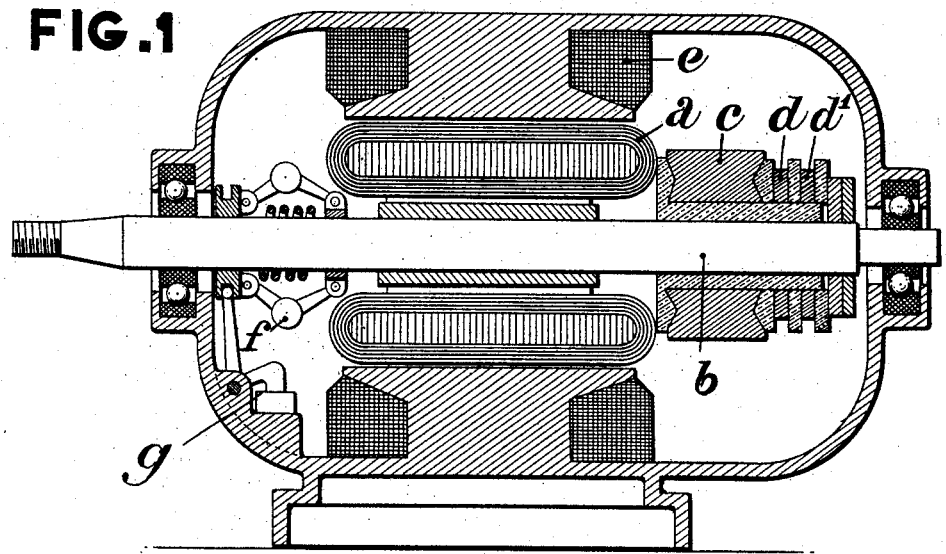
FIG.2
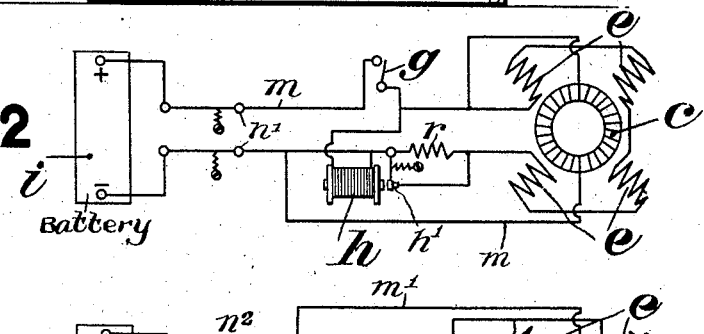
FIG.3
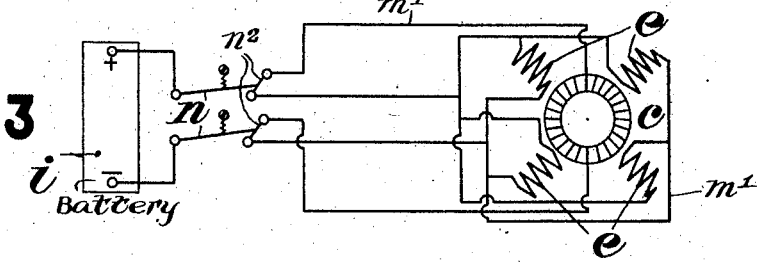
FIG.4
FIG.5
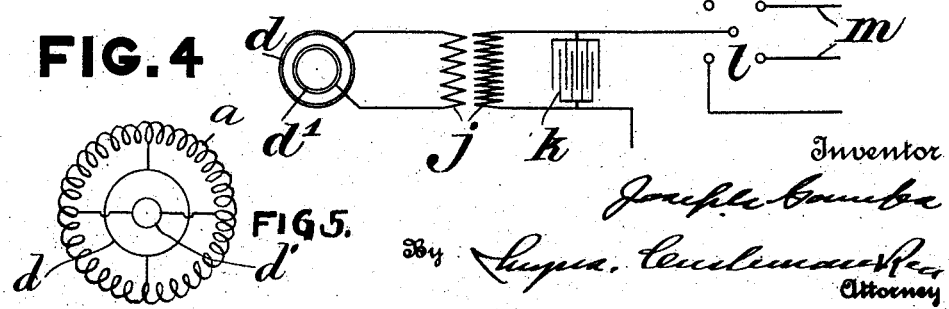
Inventor
Joseph Gambs
By Lupus Ceulemans
Attorney

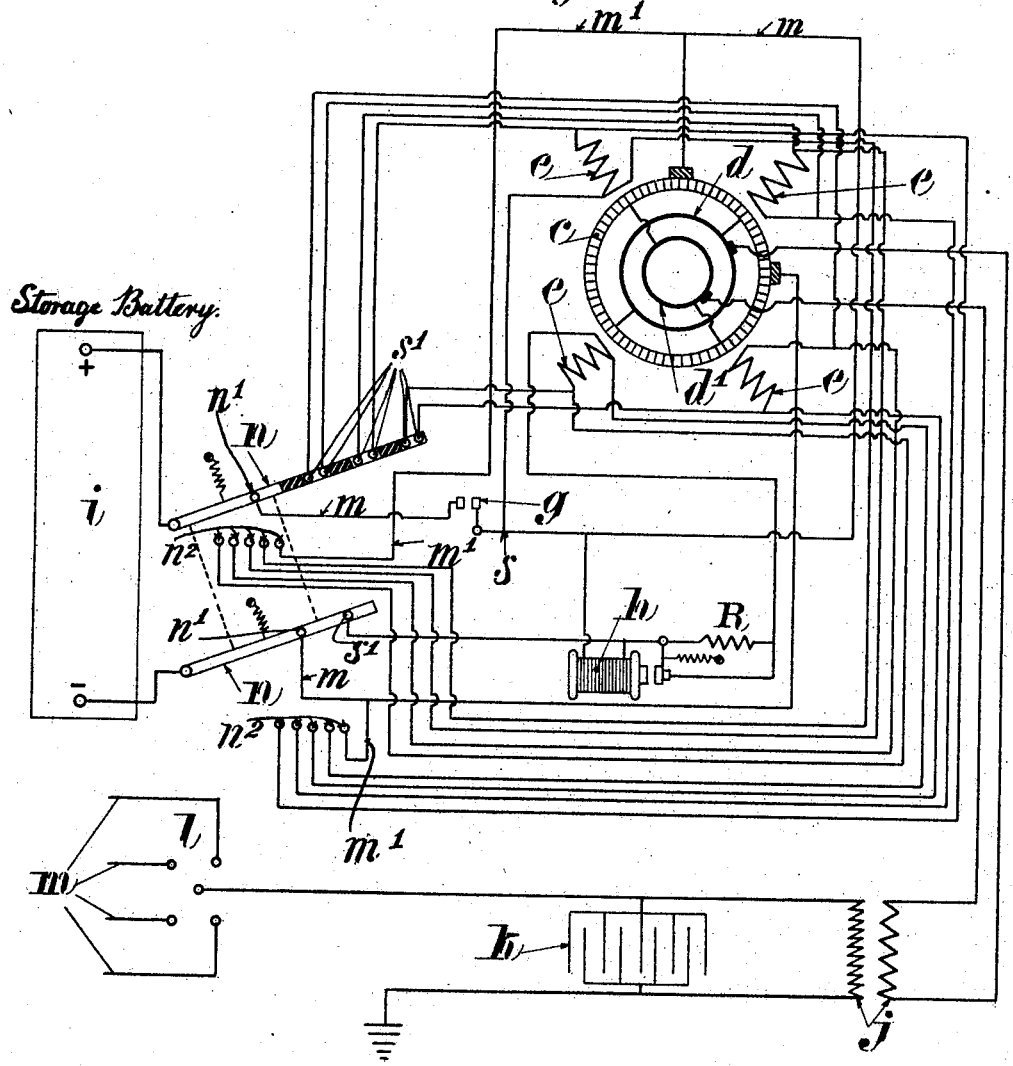

UNITED STATES PATENT OFFICE.

JOSEPH GAMBS, OF LYON, FRANCE.

ELECTRIC GENERATOR FOR MOTOR-VEHICLES.

1,391,679.  Specification of Letters Patent.  Patented Sept. 27, 1921.

Application filed July 27, 1918. Serial No. 247,072.

*To all whom it may concern:*

Be it known that I, JOSEPH GAMBS, a citizen of the French Republic, of Lyon, France, have invented a certain new and useful Electric Generator for Motor-Vehicles, of which the following is a specification.

The object of the invention is to provide improved electric apparatus for use on motor vehicles, wherein means for starting an internal combustion engine, operating the ignition, charging an accumulator and supplying current for lighting the car and heating or other purposes, are combined in a single set.

The invention is illustrated in the accompanying drawing, wherein—

Figure 1 is a vertical section of a dynamo-electric machine capable of operating alternatively as a generator and a motor.

Fig. 2 is a diagram showing the general arrangement of the armature, field coils and battery when the machine is operating as a generator, and Fig. 3 is a similar diagram showing the arrangement when the machine is operating as a motor, but in these two diagrams details of the connections whereby the respective circuits are made alternatively are omitted.

Fig. 4 is a diagram of the ignition circuit.

Fig. 5 is a diagram illustrating the connection of the armature coil to the slip rings.

Fig. 6 is a diagram showing all the circuit connections for the two alternative functions of the machine.

The machine has an armature $a$ of the ring or drum type, comprising a single winding and mounted upon a shaft $b$ adapted to be driven by the engine. The armature winding is connected to a commutator $c$ and to two slip rings $d$, $d'$.

The field magnet is shunt-wound, and the machine has two alternative circuit systems whereby the several field coils $e$ are used in series for working as a generator (Fig. 3) and in parallel for working as a motor (Fig. 3).

For the purpose of a general description of the working of the apparatus I have shown in Fig. 2 a circuit $m$, wherein the field coils $e$ are in series, and in Fig. 3 a circuit $m^1$, wherein the said coils are in parallel. For details of the circuits reference will subsequently be had to Fig. 6.

Upon the shaft $b$ is mounted a centrifugal governor $f$, set so that when the shaft, driven by the engine, attains a predetermined speed, the governor closes an automatic switch $g$ in the circuit $m$ shown in Fig. 2. This switch $g$ is held open by its spring until the shaft attains that speed. The circuit $m$ joined to the poles $n'$ of a two-way switch $n$ connected to an accumulator battery $i$. When the switch $n$ is set as shown in Fig. 2 the machine, driven by the engine, charges the battery $i$. To prevent charging the battery at an excessive voltage, when the engine exceeds a certain speed, an electromagnetic circuit-breaker $h$ is provided, which breaks the field circuit at $h'$, but leaves the said circuit closed over a resistance R, in order to prevent sparking at the contacts.

The switch $n$ is held by springs in the position shown in Fig. 2, but can be shifted by the driver into the position shown in Fig. 3, in which it closes the circuit system $m'$ joined to its poles $n^2$. In this circuit system $m'$ the field coils $e$ are disposed in parallel. With this arrangement the battery current drives the machine, as an electromotor, for starting the engine.

The ignition apparatus shown in Fig. 4 includes a transformer $j$, whose primary coil is connected to the slip rings, $d$, $d'$, the secondary coil being connected to earth and to a distributor $l$, from which wires $m$ lead to the spark plugs. A condenser $k$ is connected across the high tension leads.

In Fig. 6 the switch $n$ is shown in position for connecting the field coils in series. From the contacts $n^1$ the wires $m$ lead to the brushes bearing against the armature; at $s$ is one terminal of a shunt circuit, in which the coils $e$ are connected in series, this shunt circuit including three pairs of contacts $s^1$ closed by the upper switch arm, and a contact $s^2$ closed by the lower switch arm. For connecting the coils in parallel with each other, the switch arms are shifted on to the two series of contacts $n^2$; each of these series of contacts comprises one stud from which a wire $m^1$ leads to one of the brushes, and four studs from which wires lead to the four coils respectively.

What I claim is:—

1. In apparatus for the purpose set forth the combination of an accumulator battery, a shaft, a commutator on said shaft, an armature on said shaft having a single winding, a plurality of field coils coacting with said armature, means including electric conductors and a manually controlled two-way switch for connecting said field coils and said armature to said battery in two alternative circuits, in one of which said coils are in series with each other and in parallel with the armature, and in the other of which said coils are in parallel with each other and in parallel with said armature, an automatic switch for opening the circuit wherein said coils are in series with each other, and a centrifugal governor on said shaft, whereby said automatic switch is closed when said shaft attains a predetermined speed.

2. In apparatus for the purpose set forth the combination of an accumulator battery, a shaft, a commutator on said shaft, and armature on said shaft having a single winding, a plurality of field coils coacting with said armature, means including electric conductors and a manually controlled two-way switch for connecting said field coils and said armature to said battery in two alternative circuits, in one of which said coils are in series with each other and in parallel with the armature, and in the other of which said coils are in parallel with each other and in parallel with said armature, an automatic switch for opening the circuit wherein said coils are in series with each other, a centrifugal governor on said shaft, whereby said automatic switch is closed when said shaft attains a predetermined speed, and an electromagnetic circuit breaker whereby the circuit in which the coils are in series is broken when a predetermined voltage is exceeded.

In witness whereof I have signed this specification in the presence of two witnesses.

JOSEPH GAMBS.

Witnesses:
JOHN F. SIMONS,
D. H. SLAWSON.